UNITED STATES PATENT OFFICE.

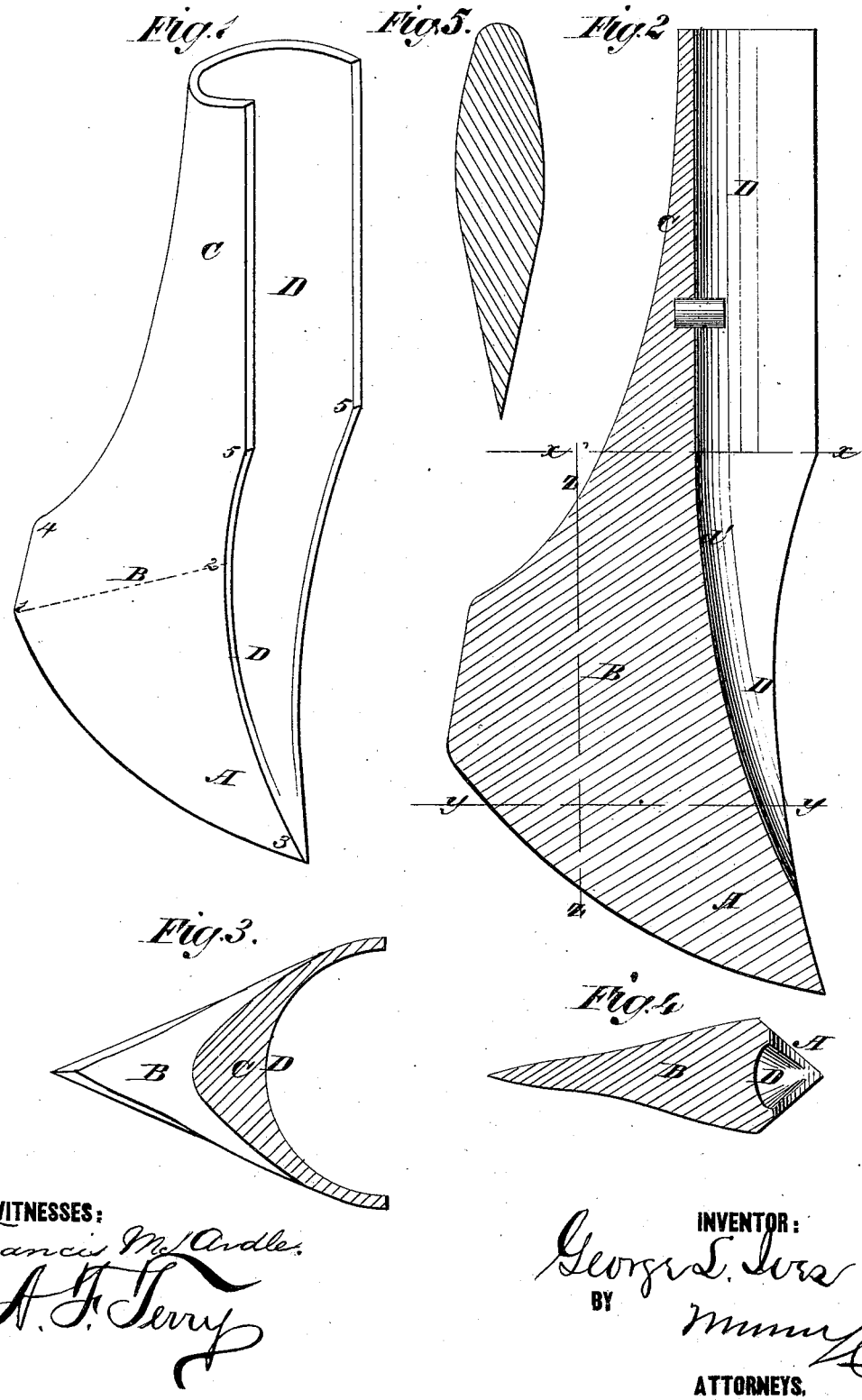

GEORGE L. IVES, OF GALESBURG, MICHIGAN, ASSIGNOR TO HIMSELF AND HENRY L. KEITH, OF SAME PLACE.

IMPROVEMENT IN GRAIN-DRILL TEETH.

Specification forming part of Letters Patent No. 166,779, dated August 17, 1875; application filed June 12, 1875.

*To all whom it may concern:*

Be it known that I, GEORGE L. IVES, of Galesburg, in the county of Kalamazoo and State of Michigan, have invented a new and useful Improvement in Grain-Drill Tooth, of which the following is a specification:

Figure 1 is a perspective view of my improved grain-drill tooth. Fig. 2 is a vertical longitudinal section of the same. Fig. 3 is a cross-section of the same, taken through the line $x\ x$, Fig. 2. Fig. 4 is a cross-section, taken through the line $y\ y$, Fig. 2. Fig. 5 is a detail section, taken through the line $z\ z$, Fig. 2.

Similar letters of reference indicate corresponding parts.

The invention will first be described in connection with drawing, and then pointed out in claim.

A represents the point, B the body, and C the shank, of the tooth to be attached to an ordinary drill-tube. The sides of the tooth from the line 1 2 are rounded off or inclined upward and forward and downward and forward. The lower forward edge of the tooth between the points 1 3 is slightly curved or made runner-shaped, as shown in Figs. 1 and 2, so that the tooth may pass easily through the ground, so that rubbish cannot collect under and around the point of the tooth to prevent the grain from being evenly deposited in the drill or trench opened by said tooth. The forward edge of the tooth between the points 1 4 slightly inclines to the rearward, as shown in Figs. 1, 2, and 3. From the point 4 the forward side inclines or is curved to the rearward and upward into the shank C. This construction prevents any rubbish that may be upon the surface of the ground from lodging upon the tooth and clogging it. In the rear edge of the tooth is formed a groove, D, the upper part of which, down to about the point $d'$, is vertical. From the point $d'$ the groove D curves or slopes to the rearward until it runs out a little above the point of the tooth, so as to conduct the seed into the trench opened by the tooth before said trench has been partially filled by the falling in of the soil. The rear edges of the tooth from the points 5 to the point 2, are cut out upon a curve, as shown in Figs. 1 and 2, to allow the point to enter the ground to a greater depth without making the trench so wide that the grain will not be properly covered by the falling in of the soil. E is a wrought-iron rivet for attaching the point to the drill-tube, the end of which is cast into but not through the shank of the tooth, and which projects into the groove D, as shown in Fig. 2. This leaves the forward side of the shank C of the tooth entirely smooth.

The teeth are cast of a composition metal formed of wrought-iron, cast-iron, and steel. This composition gives a hard, smooth surface, and forms a strong and durable point.

Having thus described my invention, I claim as new and desire to secure by Letters Patent—

A tooth for grain-drill tubes, consisting of front wedge-shaped furrow-opener A and shank C, the rear cavity D running through both, being straight to cross-line $d'$, and passing out on a rearward curve near the bottom, as shown and described.

GEORGE L. IVES.

Witnesses:
JOHN T. IVES,
EDWIN P. FLANDERS.